United States Patent Office 3,402,506
Patented Sept. 24, 1968

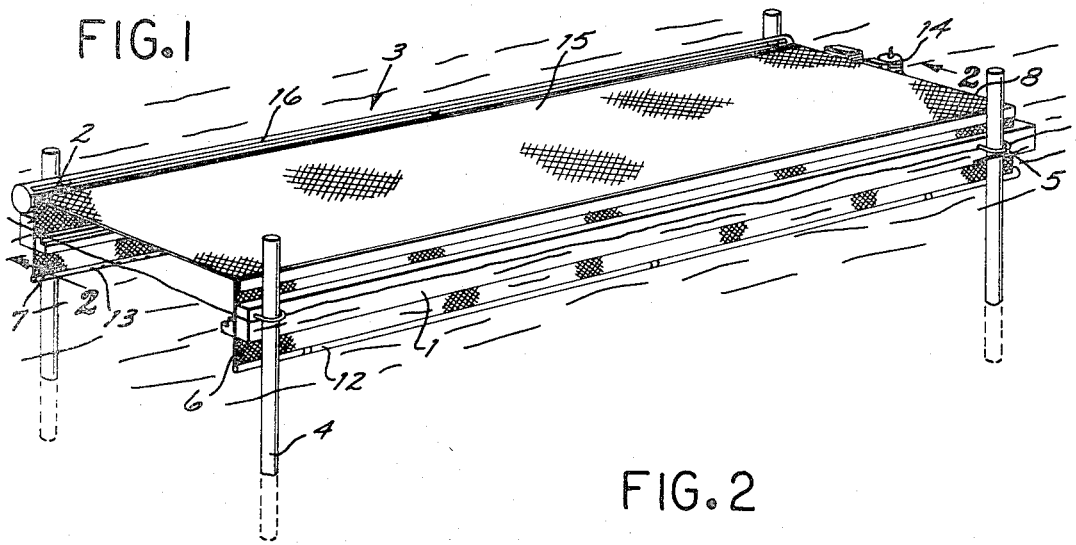
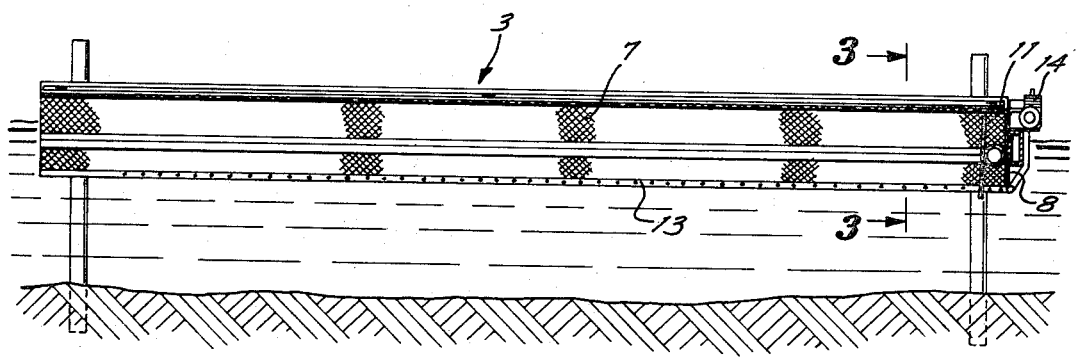
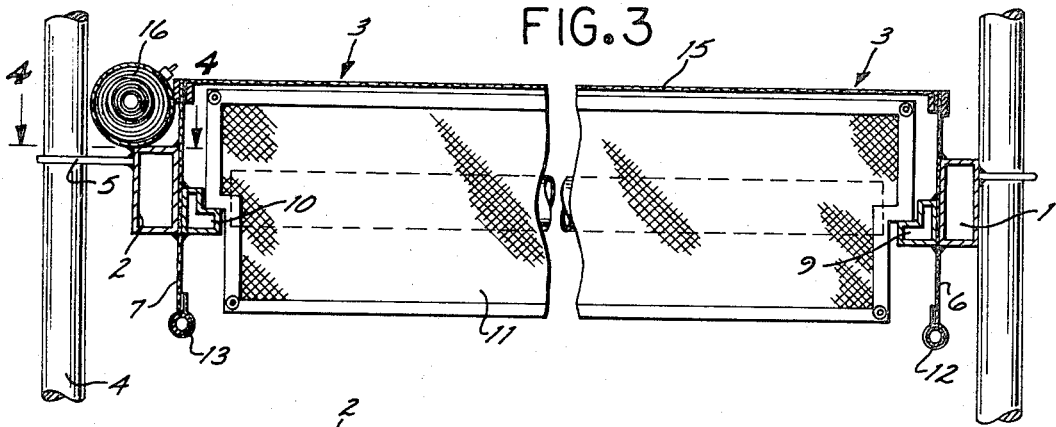
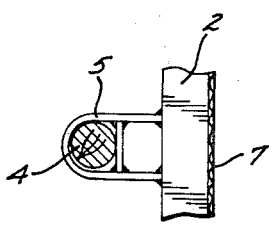

3,402,506
APPARATUS FOR GROWING WATER
PLANTS COMMERCIALLY
John C. Renfro, 48 Doheny Park Village, 34202 Del
Obispo, Dana Point, Calif. 92629
Filed Sept. 19, 1966, Ser. No. 580,497
9 Claims. (Cl. 47—1.2)

ABSTRACT OF THE DISCLOSURE

In order to grow water plants effectively and rapidly they are confined to a limited area by means of an enclosure which is mounted on piling driven into the soil below the water, and where this enclosure may rise or fall with the level of the water in which the enclosure is placed. Also, the water plants within the enclosure can be effectively harvested with a minimum of effort from a walkway which is constructed on the enclosure.

This invention relates to apparatus for growing water plants commercially, and particularly the water hyacinth, which is known as *Eichornia crassipes*. Many fertilizers contain a certain amount of cellulose, which is valuable as a mulching or soil conditioning ingredient. The water hyacinths of the instant disclosure provide a good source of bulk cellulose and nutrients which become available upon breakdown of the plant tissues by soil organisms. These water hyacinths may be added to said fertilizers, be incorporated therein at the time of manufacture or may be used alone in the fields. Water plants have a very advantageous position with respect to their water supply, since the roots of the plant are continuously in the water. The protoplasts not only maintain the ability to retain the dissolved substances which the cell manufactures or absorbs, and the plant cells will obtain water by simple diffusion or osmosis. This results in a very rapid and effective growth of the plant. The primary photosynthetic act is to convert light energy into chemical energy which the cell of the plant then uses in various ways. This energy transformation is accomplished by chloroplasts, by photosynthetic action or phosphorylation and by mitochondria by oxidative action or phosphorylation.

An object of my invention is to provide an effective apparatus for growing water plants commercially so that the plants will thrive and will multiply rapidly under ideal conditions.

Another object of my invention is to provide a novel apparatus of the character stated which will provide an effective and simple means of harvesting the water plants at intervals and as these plants mature.

Still another object is to provide a noval apparatus of the character stated in which the growing water plants are confined in a definite area and, therefore can, be tended or protected in an effective manner.

While I have referred to the water hyacinth, this is intended merely as an example, since other floating water plants which have rapid growth could also be effectively utilized in my apparatus.

Other objects, advantages and features of invention may appear from the accompanying drawing, the subjoined detailed description and the appended claims.

In the drawing

FIGURE 1 is a perspective view of a cage embodying my apparatus for growing water plants.

FIGURE 2 is a sectional view taken on line 2—2 of FIGURE 1.

FIGURE 3 is a sectional view taken on line 3—3 of FIGURE 2.

FIGURE 4 is a sectional view taken on line 4—4 of FIGURE 3.

Referring more particularly to the drawing, the numerals 1 and 2 indicate floats or pontoons which are spaced a considerable distance apart, for example, 10 or 20 feet, and have a very substantial length such as 50 feet more or less. The pontoons or floats are large enough to permit a workman to walk the length of the cage 3, for the purpose of tending the crop of water plants within the cage. The floats or pontoons 1-2 are slidably mounted on vertical piling 4 which are driven into the bottom of the lake, lagoon, or the like. A plurality of rings or loops 5 project horizontally from the pontoons 1 and 2 and encircle the piling 4. Vertical screens 6 and 7 are fixedly attached to the pontoons 1 and 2 respectively, and these screens extend the full length of the cage 3. A similar screen 8 extends between the screens 6 and 7 at the off shore end of the cage 3 to thus enclose the cage on three sides. These screens are all formed of a wire mesh of sufficient size and strength to retain the water plants. The screens 6-7 and 8 are each approximately 36 inches in height and extend the full length and width of the cage 3, as previously described. The screens 6-7 and 8 are thus floated on the water and will effectively retain the water plants within the cage during the growing period. A pair of horizontal rails 9 and 10 are fixedly attached to the pontoons 1 and 2 respectively, and these rails extend the full length of the cage 3. A collector or harvesting blade 11 is also formed of a wire mesh material and is supported on the rails 9 and 10. The blade 11 can be drawn the length of the rails 9-10, either manually or by suitable power means, not shown. The blade 11 thus will harvest the water plants by pushing them to the open or on shore end of the cage 3.

To expedite the growth of the water plants it is desirable to feed air or oxygen to the roots of the plants, and this is accomplished by means of a horizontal tube 12 and 13 mounted on the lower edge of the screens 6 and 7 respectively. These tubes are perforated to permit air to pass out of them and into the water and thence around the roots of the plants. A power driven pump 14 pumps the air into the tubes 12 and 13 to supply the necessary air to the roots of the plants.

To protect the leaf portion of the plants, and also to prevent the plants from being blown out of the cage 3 during a storm, I may provide a cover 15 which extends across the cage 3, and is also formed of a suitable wire screen or mesh. Also if it is necessary to protect the plants against excessive sun or for other reasons, I may provide a long roll of cloth or flexible metallic sheet 16 which extends the full length of the cage 3 and is mounted on one of the pontoons 1 or 2. The cover 16 can be drawn over the top of the cage 3 from one side to the other to exclude the direct rays of the sun for a portion of the day if it is desirable or necessary.

In operation

The cage 3 is mounted in a river, lake, lagoon, or the like, and extends either at right-angles to or parallel to the shore. The water plants, such as the water hyacinth, are placed within the cage 3, and since they are confined and properly tended will grow and expand very rapidly. When the cage 3 is completely filled with the water plants they are pushed to the open on shore end of the cage 3 by means of the blade or scraper 11. When one batch of water plants has been harvested, another group of plants can be immediately planted and will start to grow. After the water plants have been harvested from the cage 3 they are properly crushed, cut, or macerated to add to other products to form a humus which can be placed on land or the soil adjacent to plants.

Having described my invention, I claim:

1. The apparatus for growing water plants commercially comprising a cage enclosing the plants, means supporting the cage in a body of water, and a collector blade movably mounted in said cage to gather the water plants and move the same to one end of the cage for harvesting, said blade being adapted to traverse the entirety of said cage and expel plants therefrom at said one end.

2. The apparatus for growing water plants commercially as recited in claim 1 and said cage being formed of a wire mesh material.

3. The apparatus for growing water plants commercially as recited in claim 1, and said supporting means comprising pontoons on the cage.

4. The apparatus for growing water plants commercially as recited in claim 1, said cage being formed of a wire mesh material, and said supporting means comprising pontoons on the cage.

5. The apparatus for growing water plants commercially as recited in claim 1, and said cage being enclosed on three sides and open on one side to permit removal of the water plants.

6. The apparatus for growing water plants commercially as recited in claim 1, and said cage being enclosed on three sides and open on one side to permit removal of the water plants, and said supporting means comprising pontoons on the cage.

7. The apparatus for growing water plants commercially as recited in claim 1, and an air tube on the bottom edge of the cage, and blower means connected to said air tube.

8. The apparatus for growing water plants commercially as recited in claim 1, and an air tube on the bottom edge of the cage, and blower means connected to said air tube, and said supporting means comprising pontoons on the cage.

9. The apparatus for growing water plants commercially as recited in claim 1, and an air tube on the bottom edge of the cage, and blower means connected to said air tube, and said cage being enclosed on three sides and open on one side to permit removal of the water plants.

References Cited

UNITED STATES PATENTS

| | | | |
|---|---|---|---|
| 2,283,472 | 5/1942 | Tuxhorn | 47—1.2 X |
| 2,686,754 | 8/1954 | Monod | 47—1.4 X |
| 3,155,609 | 11/1964 | Pampel. | |
| 1,252,500 | 1/1918 | Schnoor | 119—5 |
| 1,336,356 | 4/1920 | Johnson | 43—105 |
| 1,498,760 | 6/1924 | Skrmetti | 43—104 X |
| 2,813,507 | 11/1957 | Miller | 119—3 X |
| 3,237,339 | 1/1966 | Rice | 119—3 X |

ROBERT E. BAGWILL, *Primary Examiner.*